June 8, 1965     G. WEISSENBERG     3,188,467
INSTRUMENT FOR THE DETECTION OF INFRA-RED RADIATION
Filed Oct. 26, 1959
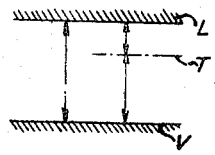
Fig.1
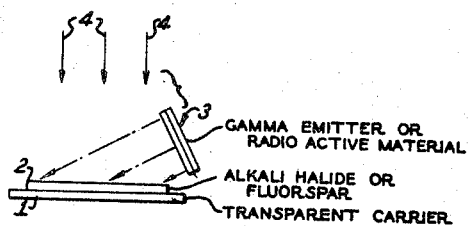
Fig.2
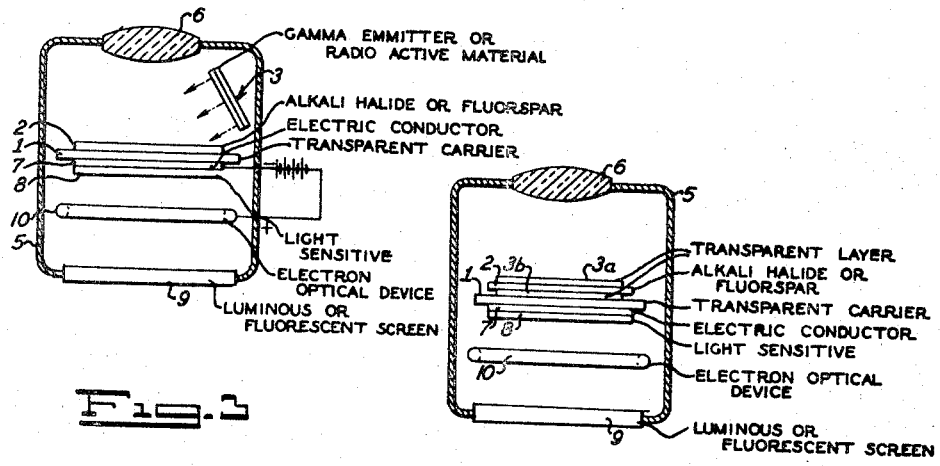
Fig.3
Fig.4
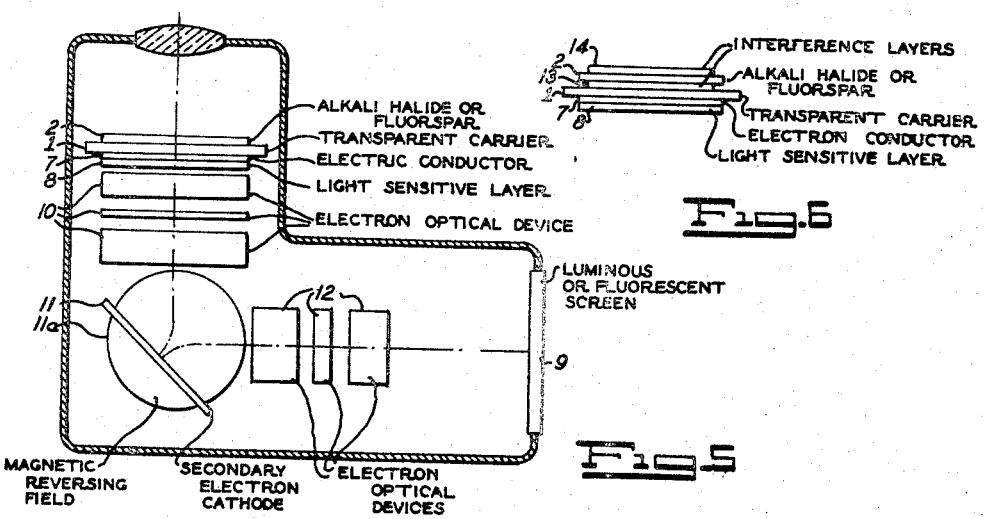
Fig.6
Fig.5

United States Patent Office  3,188,467
Patented June 8, 1965

3,188,467
INSTRUMENT FOR THE DETECTION OF
INFRA-RED RADIATION
Gustav Weissenberg, Wetzlar (Lahn), Germany, assignor to Ernst Leitz G.m.b.H., Wetzlar, Germany
Filed Oct. 26, 1959, Ser. No. 848,864
Claims priority, application Germany, Dec. 11, 1958, L 31,947
16 Claims. (Cl. 250—71)

The present invention relates to apparatus for the detection of infra-red radiation and to image converter tubes equipped with said apparatus.

The art is familiar with a number of methods for detecting infra-red radiation or infra-red pulses. The receivers used for this purpose are, for example, bolometers, thermo-elements and photo-electric cells. The first-named instruments have, however, the disadvantage that their thermodynamic efficiency is extremely small. In addition, the more sensitive these detection instruments are, the bigger becomes their half-life period. It is, therefore, impossible to use such instruments to receive rapid impulse sequences for measuring purposes or for showing a visible image. The photo-electric cells, on the other hand, which do not show these disadvantages, can be used only in a wavelength range of up to about $4\mu$ since the work function of electrons in the case of greater wavelengths is greater than the energy of radiated infra-red light quanta.

Also known is the method of producing so-called negative viewing apparatus by using the property of certain phosphorescent substances, in which molecules excited by ultraviolet or electronic radiation lose their energy by infra-red quanta by "extinction." In addition, it is known that phosphorescent substances can be extinguished by heat or infra-red radiation. This property has already been used for detecting infra-red radiation. The phosphorescent substances light up briefly while radiating the stored luminous energy and, having lit up, appear darker at the irradiated places than at the other portions of the substances. Also, known is the so-called "thermoluminescence," the property of certain substances, especially crystals, such as, for example, fluorspar.

The invention relates to a detecting apparatus for infrared radiation which utilizes the above-mentioned thermoluminescence. The collecting device for the infra-red radiation according to the invention is a layer of a thermoluminescent substance of a thickness of up to several $\mu$ as well as a source of rays exciting the thermoluminescent layer by radioactive radiation. The source of radioactive rays is preferably a thin transparent layer arranged at front of and/or at the back of the thermoluminescent layer if the irradiation is to be permanent. In this case, the radioactive substance may also be embedded in the thermoluminescent layer. It is advisable to apply the radioactive as well as the thermoluminescent substance by evaporation, in a manner known per se, to a suitable carrier either successively or simultaneously. But the substances may also advantageously be applied to the carrier by electrolysis, sedimentation, chemically or by utilizing surface forces, as in the Langmuir trough.

According to a special embodiment, this indicating or detecting apparatus can be developed as an image converter tube. In this case, a carrier permeable to visible light is arranged in a highly evacuated container having a window permeable to infra-red radiation, said carrier being provided, on the side opposite its window, with a layer, according to the invention, of thermoluminescent and radioactive substances. A thin, at least partically translucent, electrically conductive layer is applied to the other side of said carrier and serves as cathode for a light-sensitive layer applied thereto. It is possible to arrange at the back of the carrier, in a manner known per se, electron-optical means which serve to focus the electrons issuing from the light-sensitive layer on a fluorescent or luminous screen.

According to another embodiment of the invention, the electrons emerging from the light-sensitive layer can be focused onto another cathode with high secondary electron yield, the secondary electrons being used, possibly after further amplification on further secondary electron cathodes, for focusing on a luminous screen. It is, of course, possible to represent the electron picture on a television receiving tube, in order to insure in this manner a wireless transmission of the image received by the image converter tube.

It is advisable that the radioactive substance used be a pure gamma-ray emitter, because most light-sensitive substances are insensitive to gamma rays.

It also lies within the scope of the invention to increase the permeability and sensitivity of the individual layers by the arrangement of reflex-reducing layers or infra-red filters.

Ionic crystals, especially alkali halides, are preferably used as thermoluminescent substance.

It is advisable to cool the carrier and the layers applied thereto by technical measures known per se.

As has already been stated above, the invention is based on the well known thermoluminescence of certain substances. The mechanism of thermoluminescence is not yet fully known. However, it can be assumed that the process takes place in the following manner:

FIG. 1 shows a diagram which is to be associated with a thermoluminescent substance. In this diagram, $V=$ the valence band,
$L=$ the conductivity band, and
$T=$ an excited or stimulated energy level (quantum state), a so-called "trap"

In such a substance, the excited level $T$ is normally charged with only a few electrons. This level which is, for example, below the conductivity band, can be very extensively charged by irradiation of, for example, gamma rays. In case of irradiation of infra-red light quanta with an energy which, expressed in electron volts, is equal to or greater than $\Delta - E$, electrons can, therefore, be raised, for example, into the conductivity band, whereupon they fall back into the valence band while emitting or radiating visible light. The visible light then displays an energy which corresponds to the difference of energy between valence band and conductivity band. This term diagram makes it apparent that infra-red light quanta, whose energy would in no case be sufficient to lift an electron from the valence band into the conductivity band, are very well able to excite a luminous radiation, provided care is taken that the energy level $T$ is constantly charged. Of decisive importance for the actual light yield is, of course, the effective cross section and hence the impulse transmission function as well as the pulse conduction. However, it is known from the example of the above-mentioned $CaF_2$-crystal that the thermoluminescence becomes effective at a temperature of about 150° C. which approximately corresponds to an energy of 0.012 ev. expressed in electron volts. Consequently, there is required only energies which are of the order of magnitude of the energies of light quanta which are associated with a wavelength of 1 to $50\mu$.

Some examples for arrangements according to the invention are illustrated in the accompanying drawings, in which:

FIG. 1 is, as noted above, an explanation diagram,

FIG. 2 is the simplest form of a detecting apparatus provided in accordance with the invention, FIG. 3 shows an image converter tube having a device provided according to the invention, FIG. 4 shows a special modification of the image converter tube according to FIG. 3, FIG. 5 shows an image converter tube with an additional secondary electron cathode, and FIG. 6 shows an embodiment with the additional use of interference layers.

In FIG. 2, a thermoluminescent layer 2 is applied to a transparent carrier 1. A source of radioactive rays 3 is provided on that side of the layer 2 which faces away from the carrier. The infra-red radiation to be indicated falls upon the thermoluminescent layer 2 in the direction of the arrows 4. It is then possible to observe the excited or stimulated thermoluminescence. FIG. 3 shows an image converter tube, where an objective 6 permeable to infra-red radiation is arranged in the wall of a highly evacuated container 5. A thermoluminescent layer 2 is mounted on a carrier 1 in the image plane of the objective 6. A source of radioactive radiation 3 is provided between the objective 6 and the carrier 1. An at least partially permeable, electrically conductive layer 7 is applied to that side of the carrier 1 facing away from the objective 6, and a light-sensitive layer 8 is applied to the layer 7. Opposite the light-sensitive layer 8 is a luminous or fluorescent screen 9, on which the emitted electrons are impinged by means of electron-optical means 10. The image converter tube operates as follows:

Radioactive radiation emanating from the source 3 so excites the thermoluminescent substance 2, that, as already described above, energy levels closely beneath the conductivity band are densely charged with electrons. The source of infra-red rays focused onto the layer 2 by means of the objective 6 causes, corresponding to the distribution of intensity, a moving of the electrons from the trap into the conductivity band, whereby the electrons moved by the infra-red radiation into the conductivity band drop back into the valence band while emitting visible light. The luminous energy corresponding in this manner to the intensity distribution of the original infra-red radiation causes in the immediately following light-sensitive layer the release of electrons, whereby forming on the luminous screen a visible picture which corresponds to the intensity distribution of the infra-red radiation. It is apparent from the above-described mode of operation that attention must merely be paid to the fact that the layers used be kept sufficiently thin that the contours remain as clear or sharp as possible.

The image converter tube according to FIG. 4 differs from that according to FIG. 3 merely in that the source of radioactive rays is arranged in the form of two transparent layers 3a and 3b in front of and at the back of the thermoluminescent layer 2.

FIG. 5 shows an image converter tube in which the radioactive substance is finely distributed in the thermoluminescent layer 2. The primary electrons emitted by the light-sensitive layer 8 are focused by means of an electron-optical lens 10 onto a secondary electron cathode 11. The electrons emerging from the secondary electron cathode 11 are shown on the luminous screen 9 by means of electron-optical devices 12A. A magnetic reversing field 11a is provided to reverse the primary or secondary electrons onto the secondary electron cathode 11 or onto the luminous screen 9.

In the embodiment of the invention according to FIG. 6, an interference layer 13 is arranged on the carrier 1, the thermoluminescent layer 2, on the layer 13, and an interference layer 14, on the layer 2. The other side of the carrier 1 carries an at least partially permeable cathode layer 7 and a light-sensitive layer 8. The interference layer 14 is developed in the manner known from the so-called "cold mirrors." It serves the purpose of transmitting the incoming infra-red light quanta without obstacle while reflecting the visible light released in the thermoluminescent layer 2 as perfectly as possible.

This causes the entire yield to increase approximately by the factor 2. The radioactive substance is again contained in the layer 2, as had been shown in FIG. 5. The interference layer 13 serves the purpose of making the light transition from the thermoluminescent layer 2 into the light-sensitive layer 8 more favorable. In the case of this interference layer 13, both the carrier 1 and the cathode layer 7 must, of course, be taken into consideration.

The use of interference layers also has the advantage that the apparatus may, for example, be made especially sensitive to a specific infra-red band. The conditions for developing the appropriate interference layers are known.

It is advantageous to build up the thermoluminescent layer of several substances which become thermoluminescent at different excitation energies. The layer in question may be produced by applying the substances in question simultaneously by evaporation, possibly together with the radioactive substance. The conditions under which this is done are also known.

The exclusive use of pure gamma-rays as radioactive substance is recommended, because the light-sensitive layers have practically no effective cross section for gamma-rays. It need hardly be mentioned that the light-sensitive layer is to be so selected that it has a particularly high efficiency during the luminescence. However, it must be taken into consideration that the constant irradiation with hard gamma rays can cause a discoloring of the various layers. When α-ray emitters are used the small range of the radiation may, for example, be a special advantage.

A special advantage of the apparatus according to the present invention resides in that the extremely short reaction time of the trap excitation and recombination of the electron with the valence band permit representing or measuring even very rapidly moving objects. The apparatus is, therefore, especially suited for all kinds of control purpose, and more particularly for the after-control of rockets of all kinds.

What is claimed is:

1. Apparatus for indicating infra-red radiation, comprising a layer of a thermoluminescent substance constituting an intercepting device for the infra-red radiation and a source of radioactive rays operatively associated with and exciting the thermoluminescent layer to raise the energy level therein to a metastable condition whereby luminous energy corresponding to the intensity distribution of the original infra-red radiation is produced when the infra-red radiation impinges upon the layer.

2. Apparatus according to claim 1, wherein the source of rays is a thin layer positioned on at least one side of the thermoluminescent layer.

3. Apparatus according to claim 1, comprising a carrier and wherein the thermoluminescent substance and source are constituted as a mixed layer on said carrier.

4. Apparatus according to claim 1 wherein the thermoluminescent layer is composed of a plurality of thermoluminescent substances.

5. Apparatus according to claim 1 comprising a carrier and wherein the thermoluminescent layer and the source of rays are constituted by an evaporation deposit on said carrier.

6. Apparatus according to claim 1 comprising a transparent carrier and wherein the thermoluminescent layer and the source of rays are constituted by an electrolytic deposit on said carrier.

7. Apparatus according to claim 1 comprising a transparent carrier and wherein the thermoluminescent layer and the source of rays are constituted by a sedimentation deposit on said carrier.

8. Apparatus according to claim 3 comprising a transparent carrier and wherein the thermoluminescent layer and the source of rays are constituted by a chemical deposit on the carrier.

9. Apparatus according to claim 1 comprising a transparent carrier and wherein the thermoluminescent layer and the source of rays are constituted by a surface-force deposit on the carrier.

10. An image converter tube comprising a carrier, a thermoluminescent layer on the carrier, an evacuated container having a window permeable to infra-red radiation and containing said carrier and layer, a source of radioactive rays within said container and operatively associated with said carrier and layer to irradiate said layer to raise the energy level therein to a metastable condition whereby luminous energy corresponding to the intensity distribution of the original infra-red radiation is produced when the infra-red radiation impinges on the layer, and a light-sensitive layer on said carrier on the side thereof opposite that of the thermoluminescent layer for releasing electrons in response to the luminous energy produced by the thermo-luminescent layer.

11. A tube according to claim 10 comprising an electron-optical means operatively associated with said light-sensitive layer and a screen operatively associated with said electron-optical means and on which said electrons emitted by the light-sensitive layer are impinged to cause the appearance on said screen of a visible picture corresponding to the intensity distribution of the infra-red radiation.

12. A tube according to claim 10 comprising a secondary electron cathode, means focusing electrons emitted by the light-sensitive layer onto said cathode, a screen, electron-optical means focusing emission of the secondary electron cathode onto said screen.

13. A tube according to claim 10 comprising television transmission apparatus operatively coupled to said light-sensitive layer.

14. A tube according to claim 10 comprising an interference filter on said carrier.

15. A device for the detection of infra-red radiation comprising a thermoluminescent substance of ionic crystals and means applying an exciting radioactive radiation thereto to raise the energy level therein to a metastable condition whereby luminous energy corresponding to the intensity distribution of the original infra-red radiation is produced when the infra-red radiation impinges upon the layer.

16. A device as claimed in claim 15 wherein said substance is a layer of several $\mu$'s thickness.

References Cited by the Examiner

UNITED STATES PATENTS

| 2,612,610 | 9/52 | Marshall et al. | 250—71 |
| 2,742,550 | 4/56 | Jenness. | |
| 2,920,205 | 1/60 | Choyke | 250—83.3 |
| 3,031,519 | 4/62 | Silverman | 250—71 X |
| 3,031,574 | 4/62 | Halsted | 250—71 |

OTHER REFERENCES

Garlick et al.: Electrochemical Society Journal, vol. 96, No. 2, August 1949, pages 90 to 113 incl.

Ghormley et al.: Journal of Physical Chemistry, vol 58, No. 5, May 1952, pages 548 to 554 incl.

Kallmann et al.: Physical Review, vol. 87, No. 1, July 1, 1952, pages 91 to 107 incl.

RALPH G. NILSON, *Primary Examiner.*

CHESTER L. JUSTUS, MAYNARD R. WILBUR,
*Examiners.*